(12) United States Patent
Yang et al.

(10) Patent No.: US 6,477,001 B1
(45) Date of Patent: Nov. 5, 2002

(54) DISK DRIVE APPARATUS HAVING IMPROVED AUTO-BALANCING UNIT

(75) Inventors: Hyung Kwon Yang, Suwon (KR); Chung Ku Yie, Inchon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/323,476

(22) Filed: Jun. 1, 1999

(30) Foreign Application Priority Data

Jun. 2, 1998 (KR) ............................................. 98/20311

(51) Int. Cl.[7] ............................................... G11B 19/20
(52) U.S. Cl. ..................... 360/99.08; 369/263
(58) Field of Search ........................... 360/98.08, 98.12, 360/99.12, 97.02, 98.07, 99.04, 99.05, 99.08, 99.09, 99.11; 310/51, 67 R; 369/270, 258, 271

(56) References Cited

U.S. PATENT DOCUMENTS

| | | | | |
|---|---|---|---|---|
| 5,555,233 A | * | 9/1996 | Yano et al. ................. 369/270 |
| 5,675,452 A | * | 10/1997 | Nigam ..................... 360/97.02 |
| 5,903,540 A | * | 5/1999 | Ro et al. .................... 360/263 |
| 6,005,311 A | * | 12/1999 | Matsushima ................. 310/51 |
| 6,005,749 A | * | 12/1999 | Ikuta et al. ............... 360/99.12 |
| 6,055,123 A | * | 4/2000 | Kazmierczak ........... 360/98.08 |
| 6,373,154 B1 | * | 4/2002 | Sohn et al. .................... 310/51 |

FOREIGN PATENT DOCUMENTS

| | | | |
|---|---|---|---|
| JP | 9-312058 | * | 12/1997 |
| JP | 10-83622 | * | 3/1998 |
| JP | 10-208374 | * | 8/1998 |
| JP | 11-39787 | * | 2/1999 |

* cited by examiner

*Primary Examiner*—Brian E. Miller
*Assistant Examiner*—Tianjie Chen
(74) *Attorney, Agent, or Firm*—Birch, Stewart, Kolasch & Birch, LLP

(57) ABSTRACT

An auto-balancing disk drive apparatus is disclosed which makes it possible to decrease the installation space of an auto balancing unit thereof which is capable of automatically preventing an up and down movement of a disk when the disk is rotated at a high speed, reducing the driving force which is needed for the rotation of the disk and auto balancing unit, and reducing the noise and vibration which occur at the auto balancing unit. The disk drive apparatus includes a motor generating a rotational force with respect to a rotary shaft, and an auto balancing unit installed radially laterally and co-planar with respect to the rotary shaft for automatically correcting an unbalanced state of a rotation member when an unbalanced state occurs at the rotation member.

10 Claims, 2 Drawing Sheets

DISK DRIVE APPARATUS HAVING IMPROVED AUTO-BALANCING UNIT

BACKGROUND OF THE INVENTION

1. Field of the Invention

The present invention relates to a disk drive apparatus, and in particular to a disk drive apparatus which includes an auto balancing unit capable of automatically balancing (an up and down) movement of a disk when a disk mounted on a turntable of the disk drive is rotated.

2. Description of the Background Art

As a disk drive is designed to operate at a high speed, a rotation unbalance condition (up and down movements) may occur when a disk is driven at a high speed.

The above-mentioned disk unbalance condition result in the problems that a signal recorded on a disk is not accurately reproduced, and a signal is not accurately recorded onto a disk.

The above-described disk unbalance problem may occur due to a nonuniformity of a disk when fabricating the disks. In addition, as the rotation speed of the disk is increased, the rotation unbalance problem of the disk is increased. Also, in the case that the disk is not accurately mounted on the turntable, the above-described unbalance problem may occur.

A conventional auto balancing unit which has been proposed to overcome the rotation unbalance problems of the disk will be explained.

As shown in FIG. 1, on the upper surface of a substrate 1, a rotary shaft is vertically mounted.

A ball casing 9 is installed at a lower portion of a turntable 7 inserted onto an upper end portion of the rotary shaft 6 and is downwardly extended from an outer portion of the turntable 7 and is bent inwardly toward the center of the turntable and is extended to the outer surface of the rotary shaft and is bent upwardly toward the upper portion of the rotary shaft 6 and then is extended to the lower surface of the turntable 7.

The ball casing 9 is formed in a circular plate shape like the turntable 7 and includes a space in which a plurality of metallic balls 10 are provided.

A lower portion of an outer side of the above-described space is rounded in order to implement a smooth movement of the balls 10.

A racing face 9i along which the balls 10 roll is formed at an outer portion of the inner wall of the space formed in the ball casing 9 so that a rotation unbalance which may occur when the disk is rotated is prevented.

A magnet 11 is engaged to an inner central portion of the ball casing 9.

When the apparatus is operated at a low speed or is not operated, the magnet 11 serves to prevent the balls 10 from being freely moved.

A buffering member(not shown) which is made of a rubber is formed on an outer surface of the magnet 11.

A spindle motor 3 is installed at a lower portion of the ball casing 9, and a rotor 5 which is one of the elements of the spindle motor 3 is connected with the rotary shaft 6 for thereby implementing an integral rotation with the rotary shaft 6, and a stator 4 which is another one of the elements of the spindle motor 3 is fixed to an outer portion of a bearing 2 inserted onto a lower outer portion of the rotary shaft 6.

In the drawing, reference numeral 5M designates a magnet forming the rotor 5, and 8 designates a clamp for fixing a disk on the turntable.

The operation of the conventional auto balancing unit will be explained.

First, as the rotor 5 is rotated by the driving operation of the spindle motor 3, the rotary shaft 6 is rotated. The turntable 2 is rotated by the rotation of the rotary shaft 6, and a disk (not shown) mounted on the upper surface of the turntable 2 is rotated.

At this time, when the disk is rotated at a high speed, or if the disk is rotated in a rotation unbalance state, the balls 10 in the interior of the ball casing 9 are moved along the racing face 9i of the ball casing 9 for thereby preventing an unbalanced state of the disk.

However, the above-described disk drive apparatus having an auto balancing unit has the following problems.

Since the spindle motor 3, the ball casing 9 and the turntable 7 are sequentially installed from the lower portion of the rotary shaft 6 installed on the upper surface of the substrate 1, the spaces therebetween are large, so that the entire height of the disk drive apparatus is increased.

Namely, as the spindle motor 3, the ball casing 9 and the turntable 7 are independently formed, the weight of the elements which are driven by the spindle motor 3 is increased, so that a large/high amount of power is required for rotating the spindle motor 3.

Generally, since the ball casing 9 is fabricated using a mold in order to decrease the fabrication cost, the ball casing 9 may be deformed during the operation of the apparatus or when the apparatus is not driven.

Since there is no element for fixing the outer portion of the ball casing 9 contacting with the lower surface of the turntable 7, and the balls 10 which are moved in the interior of the ball casing 9 are made of a metallic material, the outer portion(in particular the portion contacting with the turntable 10) of the ball casing 9 may be deformed by the balls 10 during the operation of the apparatus or may be deformed by an externally applied force during the operation of the apparatus.

If the shape of the ball casing 9 is deformed, a smooth movement of the balls is not implemented. If the racing face 9i which is preferably formed to have a roundness is deformed, it is impossible to implement the auto balancing operation.

SUMMARY OF THE INVENTION

Accordingly, it is an object of the present invention to provide an auto-balancing disk drive apparatus which is capable of decreasing a noise and vibration by obtaining a roundness of a racing face formed to guide balls for thereby implementing an effective auto-balancing operation.

It is another object of the present invention to provide an auto-balancing disk drive apparatus which is capable of significantly decreasing the space needed for installing an auto balancing unit for automatically balancing the rotation of a disk.

It is another object of the present invention to provide an auto-balancing disk drive apparatus which includes an auto balancing apparatus capable of decreasing the driving force needed for the rotation of a disk.

In order to achieve the above objects, there is provided a disk drive apparatus which includes a motor generating a rotational force with respect to a rotary shaft, and an auto balancing unit installed radially laterally with respect to the motor for automatically correcting an unbalanced state of a rotation member when an unbalanced state occurs at the rotation member.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The disk drive apparatus according to the present invention will be explained with reference to the accompanying drawings.

Figure 1:
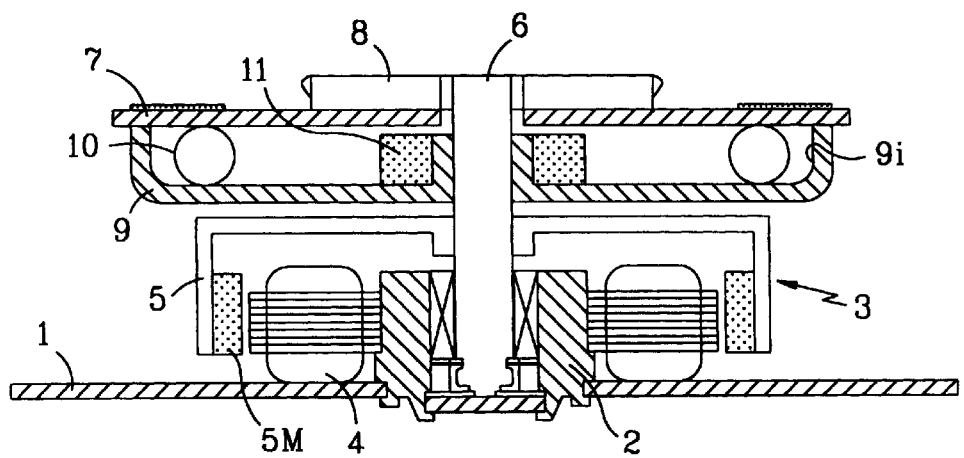
FIG. 1 is a cross-sectional view illustrating the construction of a conventional disk drive apparatus.
Figure 2B:
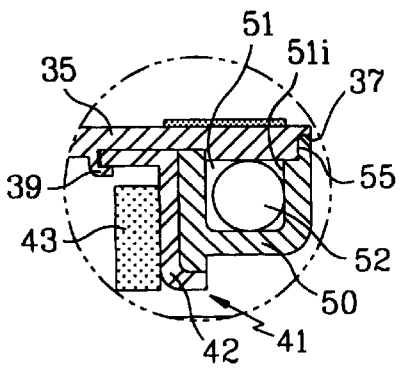
FIGS. 2a and 2b, hereinafter referred to as FIG. 2, are cross-sectional views illustrating a disk drive apparatus according to the present invention.
Figure 2A:
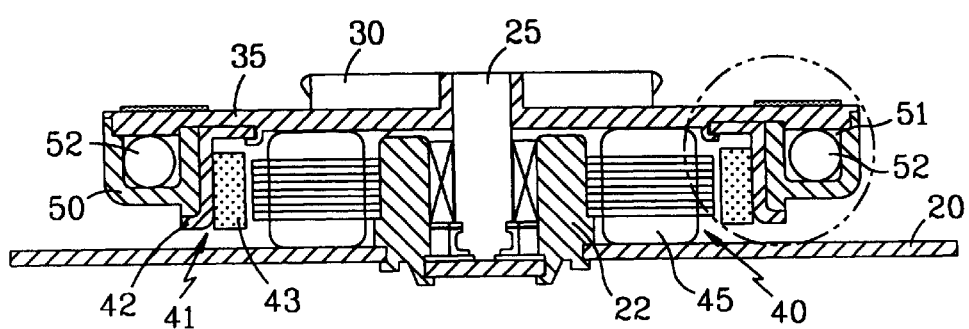
Figure 3:
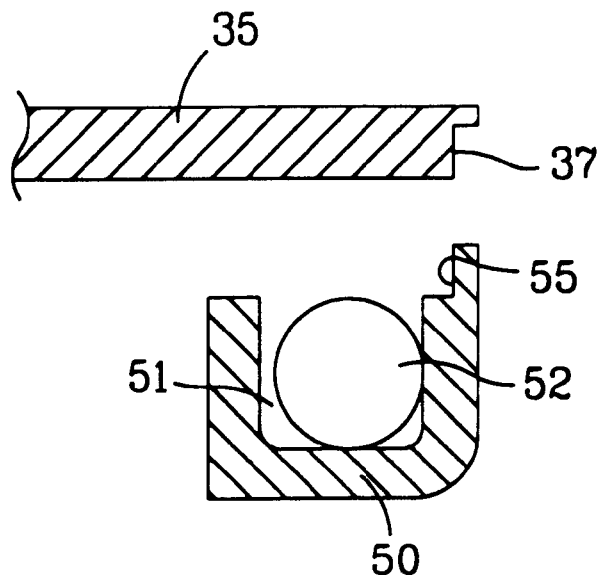
FIG. 3 is a partial cross-sectional view for explaining the structure in which a ball casing is installed at a turntable according to the present invention.

As shown in FIGS. 2 and 3, a rotary shaft 25 is vertically mounted on an upper surface of a substrate 20, via a bearing 22 inserted onto a lower end of the rotary shaft 25.

A turntable 35 having an upper surface on which a disk may be mounted is inserted onto an upper end of the rotary shaft 25.

Therefore, the rotary shaft 25 and the turntable 35 are integrally rotatable.

A clamp 30 which fixes the disk is installed at an upper portion of the turntable 35.

A ring shaped ball casing 50 is extended from a lower end portion of the turntable 35 on a lower surface of the turntable 35 and is bent and extended inwardly toward the center of the turntable 35 and is bent back upwardly toward the lower surface of the turntable 35 and is extended to the lower surface of the turntable 35 for implementing an auto balancing operation which is capable of automatically balancing the disk.

The ball casing 50 defines a space 51 into which a plurality of balls 52 which form an auto balancing unit together with the ball casing 50 are provided, and the space 51 formed in the interior of the ball casing 50 is rounded at its outer lateral portions, so that a smooth movement of the balls 52 is implemented.

The balls 52 are made of a metal, magnetic material, ceramic, etc. and are movable in the space 51. The balls 52 are moved in a radial direction in the space 51 for thereby balancing the disk when an unbalanced state occurs during rotation of the disk.

The space 51 has a width which does not exceed two times the diameter of each of the balls 52, and an outer side inner surfaces serves as a racing face 51i which guides the flow of the balls 52 during the auto balancing operation.

A spindle motor 40 is installed at a lower center portion of the turntable 35 for rotating the turntable 35. The spindle motor 40 is formed of a stator 45, and a rotor 41 which is rotated based on an electromagnetic co-operation with the stator 45.

The rotor 41 includes a yoke 42 which is formed to surround a region from a part of the lower portion of the ring shaped ball casing 50 to a part of the lower surface of the turntable 35 via an inner outer surface of the ball casing 50 and contacts with the above-described region, and a magnet 43 engaged to a portion which is parallel to an inner outer portion of the ball casing 50 at the inner surface of the yoke 42 and installed opposite the stator 45.

As shown in FIG. 2, the yoke 42 is fixed to a lower surface of the turntable 35 by a caulking work.

The ball casing 50 is installed integrally with the yoke 42 which forms the rotor 41 of the spindle motor 40 and is rotated together with the rotor 41, and the balls 52 are rotated together with the rotor 41.

An outer upper end portion of the ball casing 50 is inserted into a shoulder 37 of the turntable 35, so that the turntable 35 and the ball casing 50 are integrally rotated.

The stator 45 is installed at an outer surface of the bearing 22 and is opposite to the magnet 43.

The magnet 43 is positioned laterally horizontal to the balls 52, so that when the apparatus is driven at a low speed, or the apparatus is not driven, the balls 52 are prevented from freely moving in the interior of the space.

The engaging portion structure of the turntable 35 and the ball casing 50 will be further explained.

As shown in FIG. 3, as a roundness maintaining portion for maintaining a roundness of the ball casing 50, there are provided a first shoulder portion 55 formed at an outer upper portion of the ball casing 50, and a second shoulder portion 37 formed at an outer lower portion of the turntable 35 and engaged with the first shoulder portion 55.

The second shoulder portion 37 of the turntable 35 which is formed by cutting a portion formed of a metallic material (for example, brass) supportedly contacts with the first shoulder portion 55 of the ball casing 50 fabricated by molding, so that the ball casing 50 which is fabricated by molding is not deformed.

Figure 4:
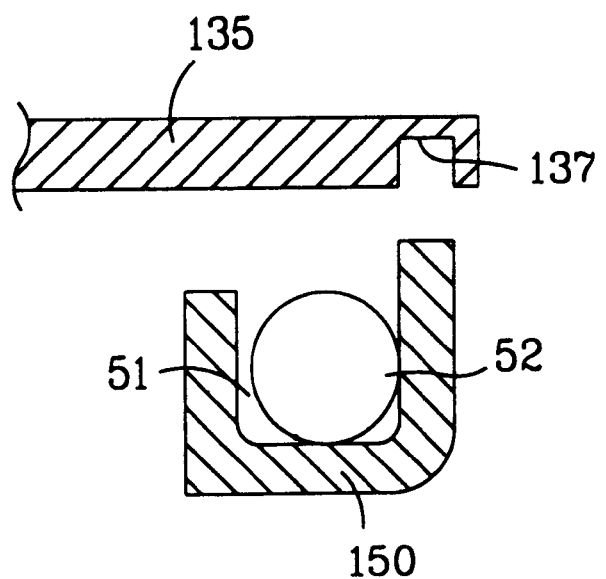
FIG. 4 is a partial cross-sectional view illustrating another embodiment of the structure in which a ball casing is installed at a turntable according to the present invention.

FIG. 4 illustrates another engaging portion structure of the turntable and the ball casing according to the present invention. An engaging groove 137 is formed in a lower surface of the turntable 135, and an outer upper portion of the ball casing 150 is inserted into the engaging groove 137.

As shown in FIG. 4, the outer end portion of the ball casing 150 is tightly inserted into the engaging groove 137 of the turntable 135 for thereby preventing any deformation of the ball casing 150, so that it is possible to maintain a roundness at an outer wall of the space 51 formed in the interior of the ball casing 150.

In the thusly constituted disk drive apparatus according to the present invention, the balls 52 are directed to compensate for any unbalanced state of the disk which may occur during the high speed rotation of the turntable 35 for thereby implementing a balanced state of the disk drive.

In more detail, when the above-described disk unbalance state occurs at the disk, the balls 52 are moved in the space 51 to the portion opposite to the portion which is deflected in the upward direction for thereby balancing the disk.

In the present invention, the ball casing 50 is installed radially outwardly of the spindle motor 40 for thereby decreasing the distance between the substrate 20 and the turntable 35 compared to the conventional art in which the ball casing is provided between the spindle motor and the turntable.

In addition, since the ball casing 50 for the auto balancing operation and the rotor 41 of the spindle motor 40 are integrally formed, the installation structure is cooperatively used. Since the size of the ball casing 40 is small, the total weight of the elements which are driven by the spindle motor 40 is decreased.

As an example of the cooperative-use of the installation structure, the upper surface of the ball casing 50 is formed by the lower surface of the turntable 35.

Therefore, the load applied to the spindle motor 40 is decreased, and the power consumption is decreased, so that the present invention is well applicable to a portable apparatus which uses a disk drive.

In addition, since an outer upper portion of the ball casing 50 is stably fixed by the shoulders 37 and 55 or the engaging groove 137, the outer portion of the ball casing 50, in particular the shape of the racing face 51i is not easily deformed.

In other words, since the roundness of the racing face 51i is maintained, it is possible to accurately control the movements of the balls 52 for thereby implementing an accurate auto balancing operation of the disk.

The ball casing 50 which is formed by molding is stably supported by the metallic turntable 35 formed by a cutting process for thereby preventing any deformation of the ball casing so.

In another embodiment of the present invention, the auto balancing unit may be installed radially inwardly of the spindle motor 40.

In the disk drive apparatus according to the present invention, since the ball casing including the balls for implementing an auto balancing operation is installed at a lower portion of the turntable corresponding to an outer portion of the spindle motor, the space occupied by the turntable, ball casing and spindle motor is decreased. In addition, since the installation structure is cooperatively-used by the above-described elements, the load applied to the spindle motor is decreased.

Therefore, the disk drive apparatus may be fabricated to be light and compact, and the power consumption is decreased.

Since the outer upper portion of the ball casing which is formed by molding is supported by the turntable which is formed by the cutting process, it is possible to implement a roundness of the racing face of the ball casing which is capable of guiding the movements of the balls for the auto balancing operation, so that it is possible to effectively prevent any unbalance of the disk which is rotated at a high speed.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A disk drive apparatus with an auto-balancing unit, comprising:
    a motor for generating a rotational force with respect to a rotary shaft and having a stator;
    a turntable rotated by the rotational force generated by the motor for mounting a disk thereon, the turntable including a rotor having a magnet installed opposite the stator, the rotor being rotated based on an electromagnetic cooperation of the magnet with the stator; and
    auto balancing means fixed to the turntable and having a upper surface installed radially laterally and co-planar with an upper surface of the stator for automatically correcting an unbalanced state of the turntable,
    wherein the magnet restricts the rotation of a rotation medium of the auto balancing means.

2. The apparatus of claim 1, wherein said rotor is integral with the turntable.

3. The apparatus of claim 1, wherein said auto balancing means includes:
    a casing defining a space therein and surrounding an outer portion of the turntable; and
    a plurality of balls provided in the space and rollable therein.

4. The apparatus of claim 3, wherein said space is formed to have a width which does not exceed two times a diameter of the balls.

5. The apparatus of claim 3, wherein the casing has an upper surface which is formed by a lower surface of the turntable.

6. The apparatus of claim 3, wherein said rotor has a yoke to fix the magnet.

7. The apparatus of claim 6, wherein said magnet and said balls of the auto balancing means are laterally disposed to one another with respect to a rotary shaft of the motor.

8. The apparatus of claim 1, wherein said auto balancing means has a roundness maintaining means which is formed at the turntable and/or a casing of the auto balancing means for maintaining a roundness of the auto balancing means.

9. The apparatus of claim 8, wherein said roundness maintaining means includes:
    a first shoulder portion formed at an outer upper edge portion of the casing; and
    a second shoulder portion formed at an outer lower edge portion of the turntable and engaged with the first shoulder portion.

10. The apparatus of claim 1, wherein said rotor has a yoke to fix the magnet.

* * * * *